UNITED STATES PATENT OFFICE.

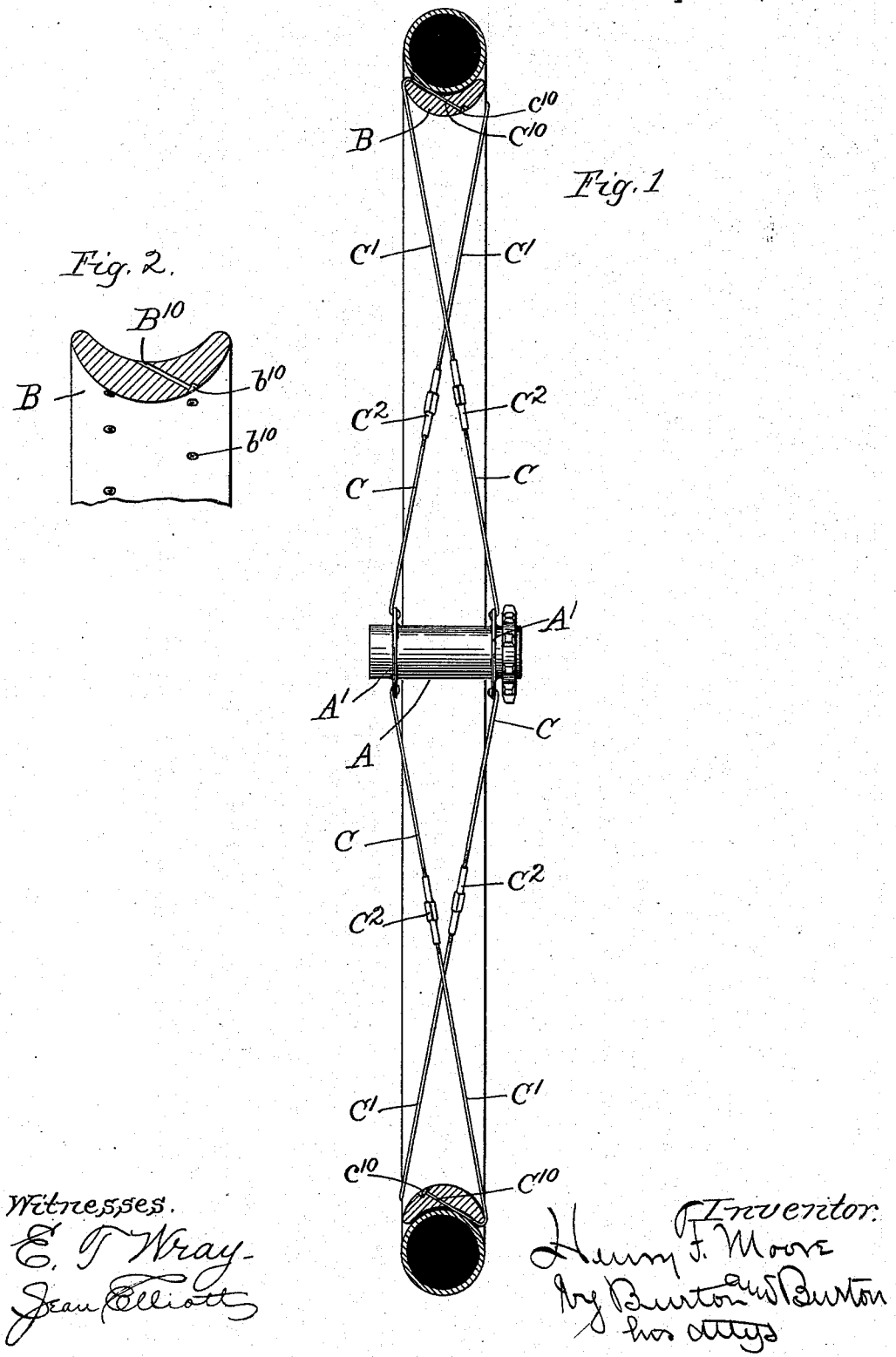

HENRY F. MOORE, OF CHICAGO, ILLINOIS.

BICYCLE-WHEEL.

SPECIFICATION forming part of Letters Patent No. 568,035, dated September 22, 1896.

Application filed November 20, 1895. Serial No. 569,561. (No model.)

*To all whom it may concern:*

Be it known that I, HENRY F. MOORE, a citizen of the United States, residing at Chicago, county of Cook, and State of Illinois, have invented certain new and useful Improvements in Bicycle-Wheels, which are fully set forth in the following specification, reference being had to the accompanying drawing, forming a part thereof.

The purpose of this invention is to provide an improved wheel for a bicycle or similar vehicle, the improvement consisting in the mode of fastening the tension-spokes to the rim in which the tire is seated, said improved method being adapted to produce a wheel equally stiff with a shorter hub or narrower spread of the spokes at the hub, and also to reduce very greatly the danger of splitting the rim or pulling the spokes out of it, the former arising with the common type of wheel when a wood rim is used, and the latter with a rim of any material.

In the drawing the figure is a diametric section through a wheel having my improved rim.

A is the hub, and B the rim, both of which are of ordinary construction, except that the hub is shorter between the flanges $A'$ $A'$, to which the spokes are attached, than is customary with the usual construction. The tension-spokes are made of two pieces $C$ $C'$, connected together by turnbuckle $C^2$. The inner end portion $C$ is connected to the flanges $A'$ of the hub in the usual manner. The outer portion $C'$ when the wheel is completed has an inwardly-bent end portion $C^{10}$, forming a hook by which the spoke is hooked over the edge of the rim, the inbent end portion extending through the rim and being suitably headed on the inner side thereof. Each spoke extends from the flange $A'$ at one side to the edge of the rim at the opposite side of the wheel, and by this means the angle of the spoke to the plane of rotation of the wheel or plane of vertical stress to which the wheel is exposed in carrying its load is made nearly double what it would be if with the same spread between the flanges $A'$ $A'$ the spokes all extended to the center line of the rim, as is customary. The stiffness of the wheel, therefore, with a given spread at the hub is very greatly increased over the ordinary construction, and a wheel equally stiff as the ordinary construction may be made, therefore, with very greatly reduced spread of the spokes at the hub. Besides this advantage the danger of splitting the wood rim B, it will be observed, is diminished from two causes. First, only half of the spokes penetrate the rim at a given plane or line of cleavage. In the ordinary construction the spokes are in the center of the rim, and the tendency of all the spokes to split the rim is therefore accumulated at that plane. In my construction this tendency is divided between two planes and is thereby reduced one-half at least. Second, the spokes which are hooked over one edge of the rim penetrate the rim at a distance from the middle toward the opposite side, as seen in the drawing. Whatever tendency there may be to split the rim caused by half the spokes penetrating the rim at each line is very largely prevented by the binding of the rim together transversely by the hooked ends of the spokes, for each end $C^{10}$, having its head drawn tightly against the inner side of the rim at the one side of the plane of the perforations made by the other half of the spokes and having its bend hooked tightly over the edges of the rim, clamps the wood together toward the line of perforations located between said edge and the head of the spoke in question. One half of the spokes thereby hooked over one edge of the rim tend to prevent splitting, which might be caused by the other half penetrating the rim.

To prepare the rim to receive the spokes, apertures $B^{10}$ for the ends $C^{10}$ will be drilled through the rim from the inner side, and a suitable tool being used for that purpose the margin of the hole would be faced down on the inner side in the plane at right angles to the drilling, as seen at $b^{10}$. The portions $C'$ of the spoke, having had a suitable head $c^{10}$ formed upon it, will be inserted through the drilled hole $B^{10}$ from the inner side, the head $c^{10}$ being brought up singly against the seat $b^{10}$; and the hook will be bent down over the opposite edge of the rim in the proper direction to make junction with the other portion $C$ of the spoke which has been hooked or otherwise properly secured to the flange $A'$. The turnbuckle $C^2$ being now properly connected to both ends may be tightened up after all the spokes are in place and the hub properly centered in a manner which is well understood by those familiar with the methods employed in making tension-wheels. I do not limit myself to the use of the turnbuckle as a means of tightening the spokes, but any suitable means may be employed. Neither do I limit myself to forming the head $c^{10}$ in the manner shown, but any suitable stop at that end of the spoke may be employed.

I claim—

1. In combination with the hub and the rim, the spokes secured at their inner ends to the hub alternately at opposite sides of the middle plane of rotation of the wheel and having their outer ends hooked over the edges respectively of the rim at the opposite side of said medial plane from that at which they are connected to the hub; said hooked ends penetrating the rim and emerging at the inner side thereof at the opposite side of the middle from the edge over which the spokes respectively are hooked; substantially as set forth.

2. In combination with the rim perforated in lines extending from the edges respectively obliquely inward across the middle plane of rotation and faced at the inner end of said perforation at right angles thereto; the spokes adapted to be inserted through said apertures and provided with suitable stops adapted to seat on said faced surfaces and bent over the said upper edges of the rim and extending thence to the hub; substantially as set forth.

In testimony whereof I have hereunto set my hand, in the presence of two witnesses, at Chicago, Illinois, this 18th day of November, 1895.

HENRY F. MOORE.

Witnesses:
 E. H. SANDFORD,
 JEAN ELLIOTT.